US010221465B2

(12) United States Patent
Hyde et al.

(10) Patent No.: US 10,221,465 B2
(45) Date of Patent: Mar. 5, 2019

(54) MATERIAL PROCESSING SYSTEMS AND METHODS

(71) Applicant: Elwha LLC, Bellevue, WA (US)

(72) Inventors: Roderick A. Hyde, Redmond, WA (US); Jordin T. Kare, San Jose, CA (US); Nathan P. Myhrvold, Medina, WA (US); Clarence T. Tegreene, Mercer Island, WA (US); Charles Whitmer, North Bend, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 1051 days.

(21) Appl. No.: 14/626,628

(22) Filed: Feb. 19, 2015

(65) Prior Publication Data

US 2016/0244861 A1 Aug. 25, 2016

(51) Int. Cl.

| | |
|---|---|
| ***H05B 6/80*** | (2006.01) |
| ***H05B 6/78*** | (2006.01) |
| ***C22B 1/00*** | (2006.01) |
| ***H05B 6/68*** | (2006.01) |
| ***C22B 4/08*** | (2006.01) |
| *G01N 22/00* | (2006.01) |

(52) U.S. Cl.

CPC .................. *C22B 1/00* (2013.01); *C22B 4/08* (2013.01); *H05B 6/68* (2013.01); *H05B 6/78* (2013.01); *H05B 6/786* (2013.01)

(58) Field of Classification Search

CPC .. H05B 6/68; H05B 6/78; H05B 6/786; C22B 1/00; C22B 4/08

USPC .......... 219/678, 698, 744, 695; 73/579, 463; 75/10.13; 250/253, 256; 423/138, 150.5, 423/49, DIG. 4

See application file for complete search history.

(56) References Cited

U.S. PATENT DOCUMENTS

| | | | |
|---|---|---|---|
| 5,161,695 A | 11/1992 | Roos | |
| 5,824,133 A | 10/1998 | Tranquilla | |
| 7,459,006 B2 | 12/2008 | Ridler | |
| 7,850,759 B2 | 12/2010 | Roy et al. | |
| 2003/0029944 A1 | 2/2003 | Flinn et al. | |
| 2009/0183597 A1 | 7/2009 | Roy et al. | |
| 2009/0314086 A1* | 12/2009 | Djordjevic | B07C 5/344 73/579 |
| 2016/0279674 A1* | 9/2016 | Kingman | B07C 5/344 |

OTHER PUBLICATIONS

Amankwah et al., "Microwave heating of gold ores for enhanced grindability and cyanide amenability", Minerals Engineering, vol. 24, 2011, pp. 541-544.

(Continued)

*Primary Examiner* — Quang T Van

(74) *Attorney, Agent, or Firm* — Foley & Lardner LLP

(57) ABSTRACT

A method of processing material includes positioning a transmitter to engage an ore sample with a sub-millisecond electromagnetic pulse, the ore sample including a conductive mineral particle and a volume of a gangue, specifying a characteristic of the electromagnetic pulse based on a desired energy deposition for the conductive mineral particle using a processing circuit, and selectively depositing energy with the electromagnetic pulse to at least one of melt and vaporize the conductive mineral particle by controlling the transmitter with the processing circuit.

15 Claims, 5 Drawing Sheets

FIG. 2

(56) References Cited

OTHER PUBLICATIONS

Changuriya et al., "Mechanisms of Disintegration of Mineral Media Exposed to High-Power Electromagnetic Pulses", Computational Methods, 2006, pp. 1607-1614.
Jones et al., "Understanding microwave assisted breakage", Minerals Engineering, vol. 18, 2005, pp. 659-669.
Kingman et al., "An investigation into the influence of microwave treatment on mineral ore comminution" Powder Technology, vol. 146, 2004, pp. 176-184.
Kingman et al., "Microwave Treatment of Minerals—A Review", Minerals Engineering, Vil. 11, No. 11, 1998, pp. 1081-1087.
Salsman et al., "Short-Pulse Microwave Treatment of Disseminated Sulfide Ores", Minerals Engineering, vol. 9, No. 1, 1996, pp. 43-54.

* cited by examiner

MATERIAL PROCESSING SYSTEMS AND METHODS

BACKGROUND

Ore may be removed from a deposit for further processing as part of a mining operation. Further processing may include at least one of crushing and milling the ore from an initial size to a size that facilitates extracting the desirable minerals therein from the gangue (i.e., the surrounding material, the non-desirable materials, etc.). Traditional processing systems mechanically reduce the size of the ore. Such traditional processing is energy intensive. The energy required to reduce the size of the ore and the achieved size reduction may not be linearly related. By way of example, reducing the size of the ore from one centimeter to millimeter- or micron-sized particles may require significantly more energy than reducing the size of the ore from ten centimeters to one centimeter. The ore is thereafter traditionally exposed to a solution that facilitates extracting the desirable mineral. However, such solutions may present environmental concerns.

SUMMARY

One embodiment relates to a method of processing material that includes positioning a transmitter to engage an ore sample with a sub-millisecond electromagnetic pulse, the ore sample including a conductive mineral particle and a volume of gangue, specifying a characteristic of the electromagnetic pulse based on a desired energy deposition for the conductive mineral particle using a processing circuit, and selectively depositing energy with the electromagnetic pulse to at least one of melt and vaporize the conductive mineral particle by controlling the transmitter with the processing circuit.

Another embodiment relates to a method of processing material that includes transferring an ore sample from a first position to a second position through a first zone using a transporter, the ore sample including a conductive mineral particle and a volume of gangue, positioning a transmitter to engage the first zone with a sub-millisecond electromagnetic pulse, specifying a characteristic of the electromagnetic pulse based on a desired energy deposition for the conductive mineral particle using a processing circuit, and selectively depositing energy with the electromagnetic pulse to at least one of melt and vaporize the conductive mineral particle by controlling the transmitter with the processing circuit.

Still another embodiment relates to a material processing apparatus that includes a transmitter and a processing circuit. The transmitter is configured to irradiate an ore sample with a sub-millisecond microwave pulse in response to a command signal, the ore sample including a conductive mineral particle and a volume of gangue. The processing circuit is coupled to the transmitter and configured to specify the command signal for the transmitter, the command signal varying based on a characteristic of the microwave pulse, and provide the command signal to the transmitter such that the microwave pulse selectively deposits energy to at least one of melt and vaporize the conductive mineral particle of the ore sample.

Yet another embodiment relates to a material processing apparatus that includes a transmitter and a processing circuit. The transmitter is configured to irradiate an ore sample with a sub-millisecond radiofrequency pulse in response to a command signal, the ore sample including a conductive mineral particle and a volume of gangue. The processing circuit is coupled to the transmitter and configured to specify the command signal for the transmitter, the command signal varying based on a characteristic of the radiofrequency pulse, and provide the command signal to the transmitter such that the radiofrequency pulse selectively deposits energy to at least one of melt and vaporize the conductive mineral particle of the ore sample.

Another embodiment relates to a material processing apparatus that includes a transporter, a transmitter, and a processing circuit. The transporter is configured to transfer an ore sample from a first position to a second position through a first zone, the ore sample including a conductive mineral particle and a volume of gangue. The transmitter is positioned to irradiate the first zone with a sub-millisecond electromagnetic pulse in response to a command signal. The processing circuit is coupled to the transmitter and configured to specify the command signal for the transmitter, the command signal varying based on a characteristic of the electromagnetic pulse, and provide the command signal to the transmitter such that the electromagnetic pulse selectively deposits energy to at least one of melt and vaporize the conductive mineral particle of the ore sample.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The invention will become more fully understood from the following detailed description taken in conjunction with the accompanying drawings wherein like reference numerals refer to like elements, in which.

DETAILED DESCRIPTION

Figure 1:
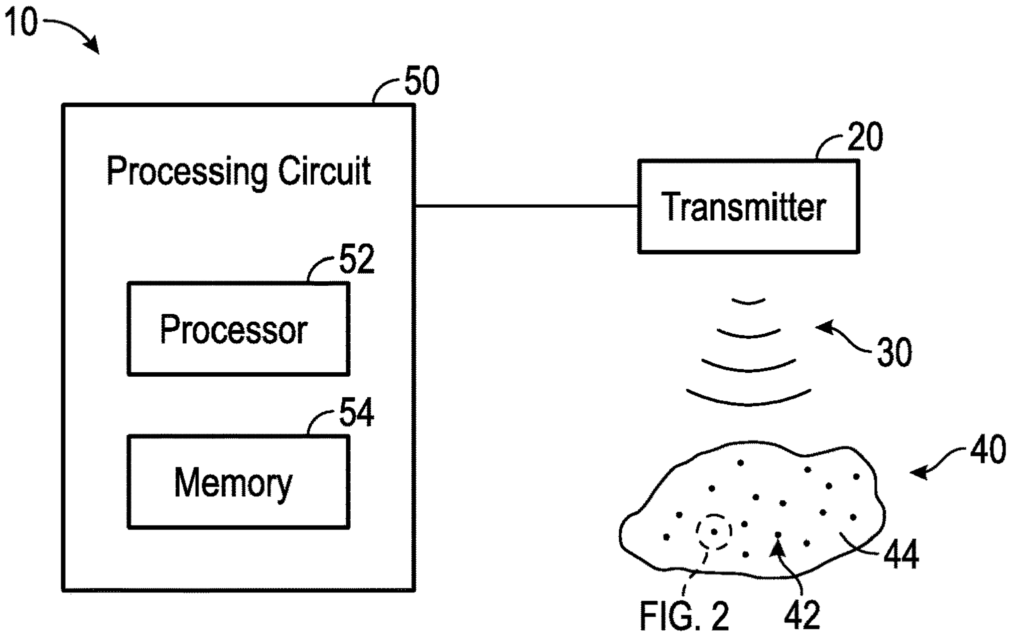
FIG. 1 is a schematic view of a material processing apparatus, according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Ore samples may include gangue that at least partially surrounds a mineral particle. A material processing apparatus may facilitate removing the mineral particle from the gangue. The mineral particles may be conductive (e.g., a material having a reduced electrical resistance, etc.) while the gangue may be less-conductive (or non-conductive). The mineral particles may include metals that occur naturally in their metallic form, either as a pure material or as an alloy (i.e., the mineral particles may include native metals, etc.). By way of example, the mineral particles may include gold, silver, copper, platinum, or still other metals. In one embodiment, the material processing apparatus includes a transmitter configured to at least one of melt and vaporize the mineral with an electromagnetic pulse as part of a primary processing step. In one embodiment, the electromagnetic pulse facilitates directly collecting the mineral (e.g., where the melted mineral separates from the gangue, where the vaporized mineral separates from the gangue, etc.). In other embodiments, the material processing apparatus subjects the ore sample to a secondary processing step (e.g., crushing, milling, etc.). Interaction between the mineral and the gangue during the initial processing step may be used to reduce the energy required to perform the secondary processing step. By way of example, the processing apparatus may at least one of melt and vaporize the mineral during the initial processing step, the melted or vaporized mineral weakening the gangue (e.g., macroscopically fracturing, microcracking, etc.) to reduce the energy required to crush, mill, or otherwise secondarily process the ore sample. The material processing apparatus may thereafter extract the mineral from the ore sample.

According to the embodiment shown in FIG. 1, material processing apparatus 10 includes transmitter 20. As shown in FIG. 1, transmitter 20 is configured to irradiate ore sample 40 with electromagnetic pulse 30. Transmitter 20 may irradiate ore sample 40 in response to a command signal provided by processing circuit 50.

In one embodiment, transmitter 20 includes a klystron. In one embodiment, transmitter 20 includes at least one of a two-cavity klystron, multi-cavity klystron, a reflex klystron, and an extended interaction klystron. In other embodiments, transmitter 20 includes at least one of a magnetron, a gyrotron, a traveling wave tube, a semiconductor microwave device, and a Gunn diode. Transmitter 20 may be configured to produce a microwave pulse, a radiofrequency pulse, or still another electromagnetic pulse. A frequency of the electromagnetic pulse may be greater than 10 MHz, greater than 100 MHz, greater than 1 GHz, greater than 10 GHz, or greater than 100 GHz. A frequency of the electromagnetic pulse may lie within the VHF band, the UHF band, the L band, the S band, the C band, the X band, the Ku band, the K band, or the Kα band. In other embodiments, transmitter 20 includes a Marx generator. In still other embodiments, transmitter 20 is configured to produce the sub-millisecond microwave pulse using a pulse compression (e.g., via a waveguide compressor, etc.) from an initially longer-duration microwave pulse.

Figure 2:
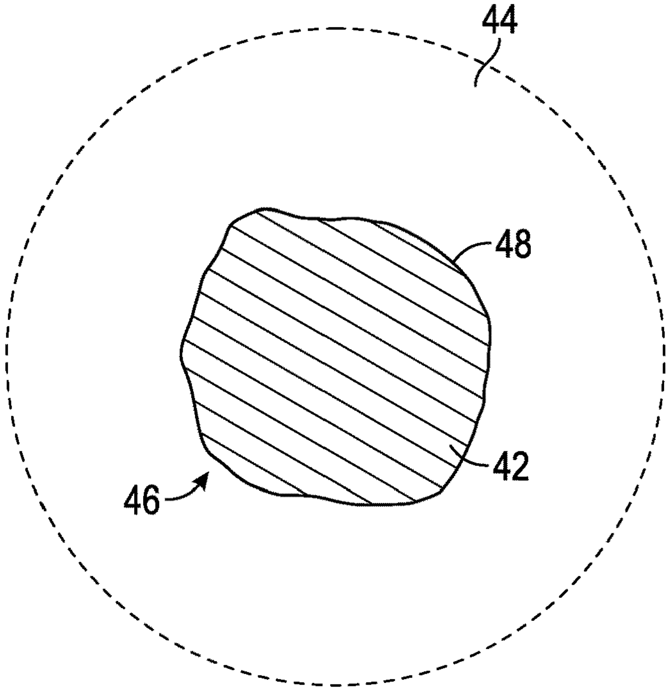
FIG. 2 is a partial detail view of an ore sample, according to one embodiment.

As shown in FIGS. 1-4, ore sample 40 includes particle 42 and volume of gangue 44. In some embodiments, ore sample 40 includes a plurality of particles 42, which may have a variety of sizes and shapes. Particle 42 may be disposed within internal cavity 46 defined by gangue 44 or may be at least partially exposed to an outer surface of ore sample 40. As shown in FIG. 2, internal cavity 46 defines a sidewall 48 along volume of gangue 44. In one embodiment, particle 42 includes an at least partially conductive mineral while gangue 44 is non-conductive. By way of example, particle 42 may include a metal (e.g., gold, silver, copper, platinum, etc.). By way of another example, particle 42 may include a sulfide (e.g., pyrite, chalcopyrite, galena, etc.). By way of still another example, particle 42 may include an oxide (e.g., magnetite, etc.).

Referring again to FIG. 1, material processing apparatus 10 includes processing circuit 50. Processing circuit 50 is coupled to (e.g., in communication with, etc.) transmitter 20, according to the embodiment shown in FIG. 1. Processing circuit 50 may be physically disposed along or in proximity to transmitter 20 or may be remotely positioned and coupled to transmitter 20 (e.g., with a wired connection, with a wireless connection, etc.). In one embodiment, processing circuit 50 is coupled to a plurality of transmitters 20. In other embodiments, a plurality of transmitters 20 are each coupled to a corresponding processing circuit 50.

Processing circuit 50 may be configured to evaluate the command signal for transmitter 20. In one embodiment the command signal varies based on a characteristic associated with electromagnetic pulse 30. By way of example, the command signal may itself vary (e.g., in amplitude, in frequency, in pulse length, in wave form, etc.) based on the characteristic associated with electromagnetic pulse 30, among other alternatives.

Processing circuit 50 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the embodiment shown in FIG. 1, processing circuit 50 includes processor 52 and memory 54. Processor 52 may include an ASIC, one or more FPGAs, a DSP, circuits containing one or more processing components, circuitry for supporting a microprocessor, a group of processing components, or other suitable electronic processing components.

In some embodiments, processor 52 is configured to execute computer code stored in memory 54 to facilitate the activities described herein. Memory 54 may be any volatile or non-volatile computer-readable storage medium capable of storing data or computer code relating to the activities described herein. In one embodiment, memory 54 has computer code modules (e.g., executable code, object code, source code, script code, machine code, etc.) configured for execution by processor 52. In some embodiments, processing circuit 50 represents a collection of processing devices (e.g., servers, data centers, etc.). In such cases, processor 52 represents the collective processors of the devices, and memory 54 represents the collective storage devices of the devices.

In one embodiment, processing circuit 50 retrieves the command signal from a database stored within memory 54. In another embodiment, processing circuit 50 generates the command signal. By way of example, processing circuit 50 may generate the command signal based on information associated with at least one of particle 42 (e.g., size, density, conductivity, composition, position relative to an outer surface of gangue 44, etc.) and gangue 44 (e.g., conductivity, thickness, etc.).

According to one embodiment, processing circuit 50 is configured to provide the command signal to transmitter 20. In response to receiving the command signal (e.g., after a preset time delay, immediately, etc.), transmitter 20 produces electromagnetic pulse 30. Electromagnetic pulse 30 selectively deposits energy into particle 42, according to one embodiment. The selective deposition of energy may at least one of melt and vaporize particle 42. According to one embodiment, electromagnetic pulse 30 includes a microwave pulse. According to another embodiment, electromagnetic pulse 30 includes a radiofrequency pulse.

Electromagnetic pulse 30 selectively deposits energy into particle 42 without selectively depositing energy into gangue 44, according to one embodiment. By way of example, particle 42 may be more conductive than gangue 44, and thereby absorb more energy. By way of example, gangue 44 may be non-conductive and thereby not absorb energy from electromagnetic pulse 30. Material processing apparatus 10 that irradiates ore sample 40 with electromagnetic pulse 30 has a reduced energy consumption relative to devices that subject samples to continuous wave fields. Material processing apparatus 10 reduces energy consumption by reducing conductive heat transfer from particle 42 to gangue 44, according to one embodiment. Transmitter 20 may be configured to at least one of melt and vaporize particle 42 before a significant portion of the energy absorbed by particle 42 is transferred to gangue 44.

Figure 3:
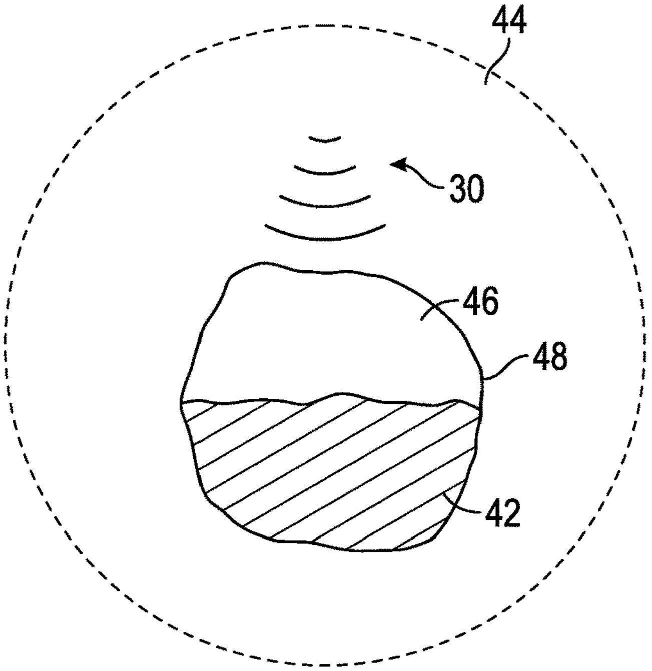
FIG. 3 is a partial detail view of an electromagnetic pulse selectively melting a mineral particle of an ore sample, according to one embodiment.

As shown in FIG. 3, particle 42 is melted by electromagnetic pulse 30 to produce a mineral liquid. Such liquification may reduce the density of particle 42 (e.g., by two grams per cubic centimeter, etc.). The drop in density, and the associated increase in volume, performs work and thereby weakens gangue 44 (e.g., macroscopically fracturing, microcracking, etc.). Weakening gangue 44 may be facilitated by a transfer of thermal energy from particle 42 into the surrounding material. During or after irradiation, particle 42 or the mineral liquid may have a temperature that is much greater than the temperature of gangue 44, and a rapid heat transfer from particle 42 or the mineral liquid into gangue 44 may produce a rapid increase in temperature and expansion of gangue 44 to facilitate weakening. By way of another example, the mineral liquid may have a reduced volume and non-uniformly transfer energy to sidewall 48 of internal cavity 46, thereby weakening gangue 44.

Figure 4:
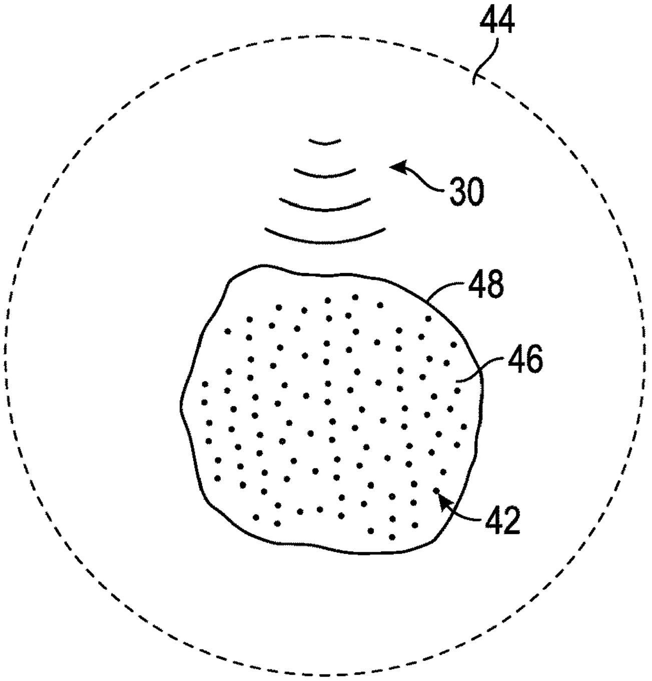
FIG. 4 is a partial detail view of an electromagnetic pulse selectively vaporizing a mineral particle of an ore sample, according to one embodiment.

As shown in FIG. 4, particle 42 is vaporized by electromagnetic pulse 30 to produce a mineral vapor. Such vaporization reduces the density of particle 42. The drop in density, and the associated increase in volume, performs work and thereby weakens gangue 44 (e.g., macroscopically fracturing, microcracking, etc.). Weakening gangue 44 may be facilitated by a transfer of thermal energy from particle 42 into the surrounding material. During or after irradiation, particle 42 or the mineral vapor may have a temperature that is much greater than the temperature of gangue 44, and a rapid heat transfer from particle 42 or the mineral vapor into gangue 44 may produce a rapid increase in temperature and expansion of gangue 44 to facilitate weakening. By way of another example, the mineral vapor may have an elevated pressure that applies a force outward on sidewall 48 of internal cavity 46, thereby weakening gangue 44.

Material processing apparatus 10 may weaken gangue 44 to facilitate extracting the mineral of particle 42 from ore sample 40 using a separation system. In one embodiment, the separation system includes a solution that is configured to facilitate extracting the mineral of particle 42. By way of example, the separation system may employ cyanidation and the solution may include at least one of sodium cyanide, potassium cyanide, and calcium cyanide. In other embodiments, the solution includes still another element or compound. The solution may convert the mineral of particle 42 (e.g., gold, silver, copper, platinum, etc.) into a water soluble coordination complex, which may be thereafter treated to extract the mineral itself.

Figure 5:
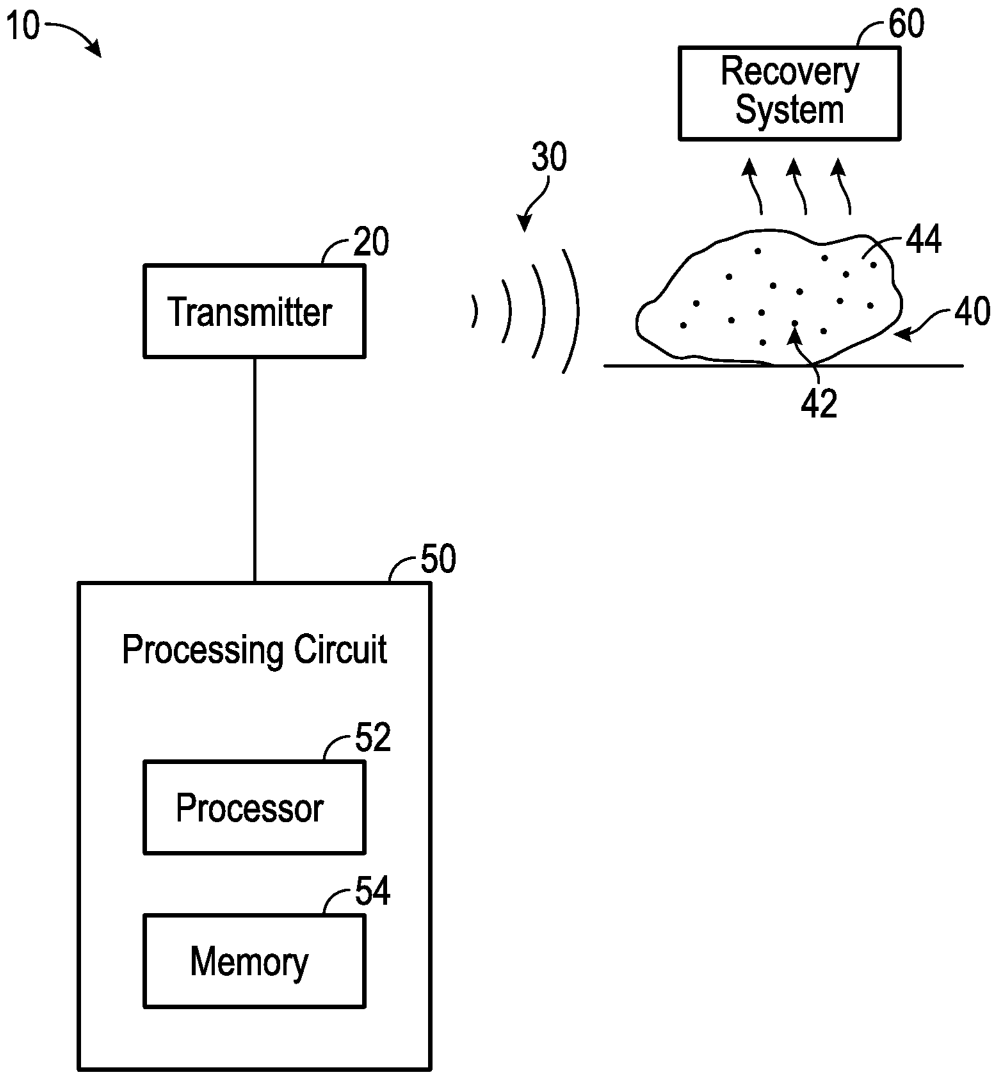
FIG. 5 is a schematic view of a material processing apparatus including a recovery system, according to one embodiment.

According to the embodiment shown in FIG. 5, mineral processing apparatus 10 includes a recovery system, shown as recovery system 60. Transmitter 20 may be configured to selectively deposit energy to at least partially vaporize particle 42 using electromagnetic pulse 30, thereby producing a mineral vapor. In one embodiment, recovery system 60 includes a vapor recovery system positioned to collect at least a portion of the mineral vapor. By way of example, recovery system 60 may be disposed above ore sample 40 such that mineral vapor produced during irradiation by transmitter 20 travels upward into recovery system 60. The mineral vapor may travel upward due to a density differential between the mineral vapor and an ambient environment. In other embodiments, recovery system 60 includes a vent configured to generate a pressure or flow gradient to draw the mineral vapor away from ore sample 40. Recovery system 60 including a vent may be disposed above, below, or to the side of ore sample 40.

According to another embodiment, transmitter 20 is configured to selectively deposit energy to at least partially melt particle 42 using electromagnetic pulse 30, thereby producing a mineral liquid. In one embodiment, recovery system 60 includes a liquid recovery system positioned to collect at least a portion of the mineral liquid. By way of example, recovery system 60 may be disposed below ore sample 40 such that mineral liquid produced during irradiation flows (e.g., due to gravity, due to surface tension, etc.) into recovery system 60. In other embodiments, recovery system 60 includes a vacuum line configured to engage ore sample 40 and extract the liquid mineral.

In one embodiment, transmitter 20 irradiates ore sample 40 with a single electromagnetic pulse 30. In other embodiments, transmitter 20 irradiates ore sample 40 with a plurality of electromagnetic pulses. The plurality of electromagnetic pulses may be successively provided by transmitter 20. In one embodiment, the plurality of electromagnetic pulses may repeatedly shock and weaken (e.g., fracture, etc.) ore sample 40. In other embodiments, the plurality of electromagnetic pulses facilitates a migration of the material of particle 42 from gangue 44 due to at least one of repetitive melting and repetitive vaporization (e.g., repeated melting due to selective deposition of energy from electromagnetic pulse 30, repeated vaporization due to selective deposition of energy from electromagnetic pulse 30, etc.). The plurality of electromagnetic pulses may have similar characteristics or may have different characteristics, according to various embodiments. By way of example, transmitter 20 may produce a first electromagnetic pulse 30 having a first set of characteristics and a second electromagnetic pulse 30 having a second set of characteristics. The first and second electromagnetic pulses 30 may be produced sequentially or in parallel (e.g., using a pair of electromagnetic sources, etc.).

According to one embodiment, the first set of characteristics associated with first electromagnetic pulse 30 facilitates selectively depositing energy to at least one of melt and vaporize a first set of particles 42 (e.g., a group of particles 42 having a first size or within a first size range, etc.) while the second set of characteristics associated with second electromagnetic pulse 30 may facilitate selectively depositing energy to at least one of melt and vaporize a second set of particles 42 (e.g., a group of particles 42 having a second size or within a second size range, etc.). In one embodiment, first electromagnetic pulse 30 has a power level configured to only heat larger particles 42 while melting smaller particles 42. Second electromagnetic pulse 30 may have a power level that, when added to the energy deposition from first electromagnetic pulse 30, melts larger particles 42 without vaporizing smaller particles 42. Accordingly, transmitter 20 may be configured to irradiate ore sample 40 with first and second electromagnetic pulses 30 to melt differently sized particles 42 without risking vaporization of particles 42.

In another embodiment, the first set of particles 42 at least one of melted and vaporized by first electromagnetic pulse 30 includes a first material (e.g., gold, etc.), while the second set of particles 42 at least one of melted and vaporized by second electromagnetic pulse 30 includes a second material (e.g., silver, etc.). Transmitter 20 may be configured to selectively irradiate ore sample 40 with first electromagnetic pulse 30 and second electromagnetic pulse 30 to facilitate selective extraction of the first material and the second material from ore sample 40, according to one embodiment.

Transmitter 20 may produce the first electromagnetic pulse 30 to selectively deposit energy and at least one of melt and vaporize particle 42, thereby weakening gangue 44. Transmitter 20 may produce the second electromagnetic pulse 30 to selectively deposit energy and at least one of the melt and vaporize particle 42, thereby further weakening gangue 44 or facilitating recovery of the mineral vapor with recovery system 60. According to one embodiment, transmitter 20 produces the second electromagnetic pulse 30 after a time delay. By way of example, the time delay may allow the at least one of melted and vaporized particle 42 to weaken gangue 44 before additional energy is deposited by the second electromagnetic pulse 30.

In one embodiment, the command signal provided by processing circuit 50 to transmitter 20 varies based on a characteristic associated with electromagnetic pulse 30. Electromagnetic pulse 30 may have an internal alternating current variation or may vary in time, according to various embodiments. In embodiments where transmitter 20 is configured to provide a plurality of electromagnetic pulses 30 having the same or different characteristics, processing circuit 50 may be configured to provide a plurality of identical or different command signals, respectively. The command signal may encode data that is read and used by transmitter 20 in producing electromagnetic pulse 30.

According to one embodiment, the characteristic includes a frequency of electromagnetic pulse 30. Electromagnetic pulse 30 may interact with particle 42 to a skin depth. By way of example, the skin depth may include a distance from a surface of particle 42 into which energy is directly deposited by electromagnetic pulse 30. The skin depth is related to the conductivity of particle 42, the permeability of particle 42, and the frequency of electromagnetic pulse 30, according to one embodiment. In one embodiment, the skin depth can be approximated as scaling with the inverse square root of the product of frequency, permeability, and conductivity of particle 42. The frequency of electromagnetic pulse 30 may be selected such that skin depth is equal or similar to a thickness of particle 42 thereby directly depositing energy into the majority, or the entirety, of particle 42. In some embodiments, electromagnetic pulse 30 preferentially has a high frequency (e.g., GHz-level, etc.). By way of example, electromagnetic pulse 30 may have a high frequency where the size of particle 42 is sufficiently small (e.g., micron-level, etc.). In other embodiments, the frequency of electromagnetic pulse 30 is selected to avoid heating other residents within ore sample 40 (e.g., materials or gangue that are preferentially heated by a particular frequency, etc.).

The frequency of electromagnetic pulse 30 may be varied based on the material of particle 42. By way of example, processing circuit 50 may vary the command signal provided to transmitter 20 based on the material of particle 42. Different materials (e.g., gold, silver, copper, platinum, etc.) may have different electrical conductivities. In one embodiment, the frequency of electromagnetic pulse 30 varies based on the electrical conductivity of particle 42. Processing circuit 50 may receive user input or sensor input relating to the electrical conductivity of particle 42 or may receive user input or sensor input relating to the material of particle 42, according to various embodiments. In one embodiment, processor 52 of processing circuit 50 may use the material of particle 42 to retrieve data relating to the electrical conductivity of particle 42 from a lookup table stored within memory 54.

According to another embodiment, the characteristic includes a pulse length of the electromagnetic pulse 30. The pulse length may be related to a shape of a waveform associated with electromagnetic pulse 30. The pulse length may also vary the total amount of energy deposited into particle 42 by electromagnetic pulse 30.

The pulse length may be defined between the points where electromagnetic pulse 30 has a non-zero amplitude (e.g., for a pulse having a step shape, etc.) or between an initial point and a point where the amplitude of electromagnetic pulse 30 falls below a threshold value. The threshold value may include a constant or may be a fraction of a maximum amplitude, among other alternatives. In one embodiment, the pulse length is specified based on the energy deposition required to at least one of melt and vaporize particle 42. In embodiments where transmitter 20 is configured to reduce the energy loss associated with heat transfer out of particle 42 before its melting or vaporization, a shorter pulse length may be specified for electromagnetic pulse 30 where particle 42 has a smaller size, compared to the pulse length sufficient for larger particle sizes.

In another embodiment, the pulse length varies based a thermal diffusivity of gangue 44. A greater thermal diffusivity produces a more rapid transfer of energy from particle 42 to gangue 44. In embodiments where transmitter 20 is configured to reduce the energy loss associated with heat transfer into gangue 44 during the melting or vaporization of particle 42, a shorter pulse length may be specified for electromagnetic pulse 30 where gangue 44 has a larger thermal diffusivity. In other embodiments, the pulse length used for electromagnetic pulse 30 varies based on a thermal diffusion rate associated with the transfer of energy from particle 42 into gangue 44. By way of example, a shorter pulse length may be used for electromagnetic pulse 30 where the thermal diffusion rate from particle 42 into gangue 44 is larger. The pulse length for electromagnetic pulse 30 may be between one nanosecond and five hundred nanoseconds. In one embodiment, the pulse length is about ten nanoseconds.

The characteristic associated with electromagnetic pulse 30 may vary an energy deposition into particle 42. In one embodiment, the characteristic produces an energy deposition into particle 42 at a rate that is greater than the thermal diffusion rate from particle 42 into gangue 44. In embodiments where the pulse energy is specified, reducing the pulse length increases the energy deposition rate and may therefore decrease the amount of deposited energy that is thermally conducted into the gangue, thereby increasing the energy efficiency of melting or vaporizing particle 42. The differential between the rate that energy is deposited into particle 42 and the thermal diffusion rate impacts the efficiency with which particle 42 is at least one of melted and vaporized. In one embodiment, the rate of the energy deposition melts particle 42. Such an energy deposition may be associated with a heat capacity and a phase change of particle 42. By way of example, the energy deposition may be used to heat particle 42 from an initial condition (e.g., an ambient temperature, etc.) to a melting point and provide the latent heat of fusion needed to complete a solid-to-liquid phase change (i.e., the energy deposition is associated with a heat capacity and a phase change of particle 42). In another embodiment, the energy deposition may be used to heat particle 42 from an initial condition (e.g., an ambient temperature, etc.) to a melting point, provide the latent heat of fusion needed to complete a solid-to-liquid phase change, heat particle 42 to vaporization temperature, and provide the latent heat of vaporization needed to complete a liquid-to-vapor phase change (i.e., the energy deposition is associated with a heat capacity, a melting phase change, and a vaporization phase change of the particle 42). By way of example, the pulse length may be specified such that prior to vaporizing or melting particle 42, less than a designated fraction (e.g., less than half, etc.) of the electromagnetic pulse energy deposited into particle 42 may be transferred (e.g., by thermal diffusion, etc.) into gangue 44. By way of another example, the pulse length may be specified such that prior to vaporizing or melting particle 42, more than a designated amount (e.g., more than half, etc.) of the absorbed electromagnetic pulse energy is in one or more particles 42 rather than being in gangue 44. By way of yet another example, the pulse length may be specified based on energy efficiency, such that more than a designated amount (e.g., 10%, 50%, 90%, etc.) of the absorbed electromagnetic pulse energy is used to melt or vaporize one or more particles 42 (e.g., used to heat the one or more particles 42 to a phase change temperature and then supply a latent heat associated with the phase change, etc.).

According to one embodiment, transmitter 20 is configured to irradiate ore sample 40 in-situ. By way of example, transmitter 20 may be used to irradiate ore sample 40 within a deposit (e.g., an underground deposit, a surface deposit exposed to an ambient environment, etc.). Irradiating ore sample 40 in-situ within a deposit may facilitate a mining operation where the selective deposition of energy into particle 42 weakens gangue 44. Weakening gangue 44 may facilitate direct recovery of the mineral within particle 42 or may increase the efficiency of a secondary processing step used to remove ore sample 40 from the deposit (e.g., blasting, hammering, sawing, another mechanical process, etc.).

Figure 6:
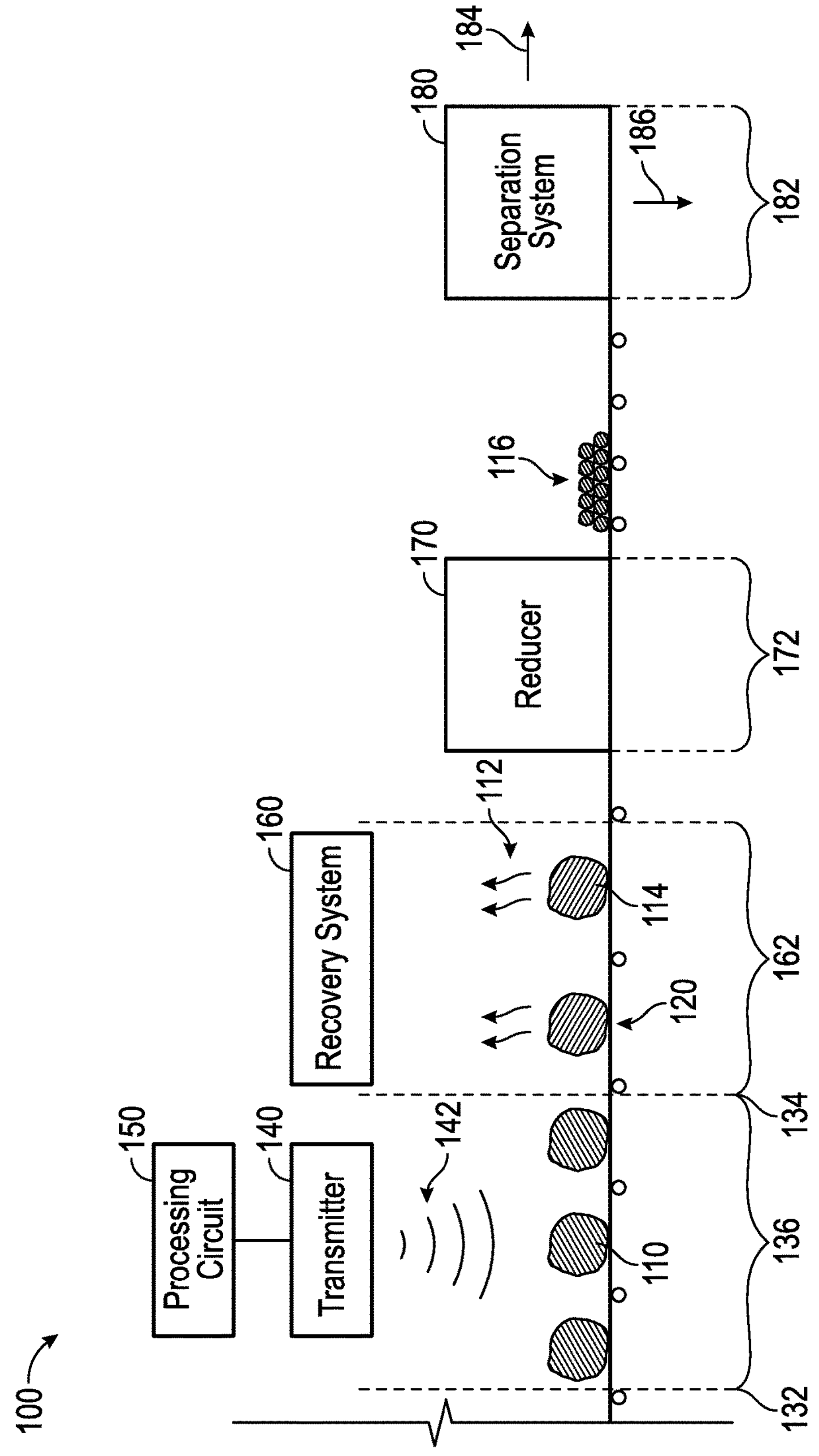
FIG. 6 is a schematic view of a material processing apparatus including a recovery system, a reducer, and a separation system, according to one embodiment.

According to the embodiment shown in FIG. 6, a material processing apparatus, shown as material processing apparatus 100, is configured to selectively deposit energy into particles (e.g., conductive metallic particles, conductive sulfide particles, conductive oxide particles, still other conductive particles, etc.) of ore samples 110. In one embodiment, ore samples 110 have a size of about one centimeter. As shown in FIG. 6, material processing apparatus 100 performs at least a portion of a comminution operation.

Material processing apparatus 100 includes transporter 120, according to the embodiment shown in FIG. 6. Transporter 120 is configured to transfer ore samples 110 from first position 132 to second position 134 through treatment zone 136. As shown in FIG. 6, transporter 120 includes a conveyor system. The conveyor system includes plurality of rollers 122 and belt 124. In other embodiments, transporter 120 includes another device configured to move ore samples 110 through treatment zone 136. By way of example, transporter 120 may include a vibratory table (e.g., an inclined table that vibrates to move ore samples 110 along a sloped surface, etc.) or a mechanized container assembly (e.g., a plurality of containers that are moved by a motor and chain system or another actuator mechanism, etc.), among other alternatives. In other embodiments, material processing apparatus 100 does not include transporter 120 (e.g., where material processing apparatus 100 facilitates extracting particles from in-situ ore samples 110 disposed within a deposit, etc.).

According to one embodiment, material processing apparatus 100 includes transmitter 140. Transmitter 140 is positioned to irradiate treatment zone 136 with electromagnetic pulse 142. In one embodiment, transmitter 140 is positioned to irradiate ore samples 110 that are transferred through treatment zone 136 by transporter 120. Transmitter 140 may be configured to emit electromagnetic pulse 142 in response to a command signal. Processing circuit 150 is coupled to transmitter 140 and configured to evaluate the command signal for transmitter 140, which may vary based on a characteristic associated with electromagnetic pulse 142. In one embodiment, processing circuit 150 is also configured to provide the command signal to transmitter 140 such that electromagnetic pulse 142 selectively deposits energy to at least one of melt and vaporize conductive particles within ore samples 110.

Transmitter 140 is configured to selectively vaporize at least a portion of the conductive particles within ore samples 110, according to the embodiment shown in FIG. 6, to produce mineral vapor 112 that separates from ore samples 110. Interaction between mineral vapor 112 and ore samples 110 may at least partially weaken the gangue of ore samples 110 to produce treated ore samples 114. As shown in FIG. 6, material processing apparatus 100 includes recovery system 160 that is configured to collect at least a portion of mineral vapor 112 within collection zone 162. Treated ore samples 114 may include additional conductive particles (e.g., solid conductive particles, melted conductive particles, vaporized conductive particles, etc.) that did not separate from ore samples 110 as mineral vapor 112. By way of example, treated ore samples 114 may include conductive particles that did not receive the requisite energy deposition for vaporization (e.g., due to their size, due to a differential electrical conductivity, etc.). In other embodiments, transmitter 140 is configured to selectively melt at least a portion of the conductive particles within ore samples 110, and recovery system 160 includes a liquid recovery device configured to collect at least a portion of the liquefied mineral.

In still other embodiments, material processing apparatus does not include recovery system 160. Transmitter 140 may be configured to selectively deposit energy and only melt the conductive particles within ore samples 110, and the melted mineral may not separate from ore samples 110. By way of another example, transmitter 140 may be configured to selectively deposit energy and vaporize the conductive particles within ore samples 110, but the vapor may not separate from ore samples 110 (e.g., the vapor may condense along the wall of a crack within the gangue of ore samples 110 due to a drop in conductivity associated with the continued decrease in density, the vapor may condense within a cavity within which the conductive particle resided prior to irradiation, etc.). Where mineral vapor or the mineral liquid does not separate from ore samples 110 or the mineral liquid, interaction between the gangue of ore samples 110 and the at least one of melted and vaporized conductive particles may nonetheless weaken gangue of ore samples 110 to produce treated ore sample 114.

Referring again to the embodiment shown in FIG. 6, material processing apparatus 100 includes reducer 170. In one embodiment, reducer 170 is configured to decrease the size of treated ore samples 114 within a reduction zone 172 to produce reduced ore material 116. Reducer 170 may include a crusher (e.g., a jaw crusher, a cone crusher, etc.), a grinding mill (e.g., a ball mill, a rod mill, an autogenous mill, etc.), or still another device configured to decrease the size of treated ore samples 114. According to one embodiment, material processing apparatus 100 is configured to weaken ore samples 110 by depositing energy into conductive particles therein with electromagnetic pulse 142 and thereafter subject treated ore samples 114 to reducer 170. Weakening ore samples 110 (e.g., the gangue of ore samples 110, etc.) prior to subjecting the material to reducer 170 decreases the energy required to crush, mill, or otherwise reduce ore samples 110 (e.g., into smaller pieces that are more efficiently processed to extract minerals from the gangue, etc.). In one embodiment, weakening ore samples 110 using electromagnetic pulse 142 reduces the energy consumption associated with melting or vaporizing the conductive particles (e.g., by reducing pre-melt or pre-vaporization heat transfer into the gangue). Such processes may reduce the total energy required to extract the minerals from the gangue (e.g., by facilitating direct collection of the mineral using recovery system 160, by reducing the energy needed to power reducer 170 by a level that is greater than the energy required to power transmitter 140, etc.). In some embodiments, a portion of ore samples 110 may not have been sufficiently reduced in size by reducer 170 (e.g., were not sufficiently weakened by irradiation within treatment zone 136, etc.). In one embodiment, the size of ore samples is monitored, and those having a size above a specified threshold are returned to treatment zone 136 for further irradiation.

As shown in FIG. 6, material processing apparatus 100 includes separation system 180. Separation system 180 may extract minerals from reduced ore material 116 within separation zone 182. In one embodiment, separation system 180 includes a solution (e.g., sodium cyanide, potassium cyanide, calcium cyanide, etc.) that converts the desirable minerals within reduced ore material 116 into coordination complex 184, thereby separating the mineral from gangue 186. By way of example, separation system 180 may include a trough or other container within which the solution is disposed. Reduced ore material 116 may be introduced into the trough or other container for exposure to the solution. In other embodiments, separation system 180 includes a nozzle, and the solution is topically applied to reduced ore material 116. Coordination complex 184 may be treated to thereafter extract the mineral itself.

In one embodiment, the ore samples travel along a linear path through material processing apparatus 100. In other embodiments, the ore samples travel non-linearly through material processing apparatus 100. By way of example, treated ore samples 114 may enter a top portion of reducer 170 and fall from a bottom portion of reducer 170. Reduced ore material 116 may fall into, may be linearly conveyed, or may be otherwise transported to separation system 180.

As shown in FIG. 6, treatment zone 136, collection zone 162, and separation zone 182 are sequentially disposed. In other embodiments, at least one of treatment zone 136, collection zone 162, and separation zone 182 at least partially overlap. By way of example, collection zone 162 may overlap treatment zone 136 such that mineral vapor 112 or mineral liquid produced during irradiation may be collected. By way of another example, collection zone 162 may overlap treatment zone 136 where material processing apparatus 100 facilitates extracting particles from in-situ ore samples 110 disposed within a deposit.

Figure 7:
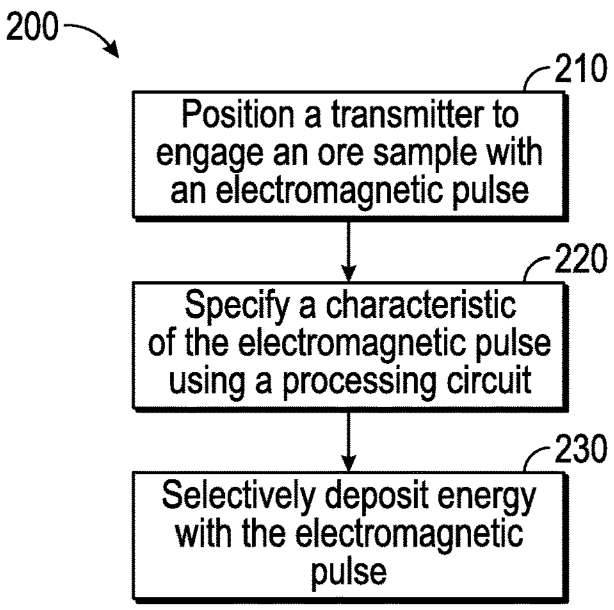
FIGS. 7-8 are flow diagrams of methods of processing materials, according to various embodiments.

Referring next to the embodiment shown in FIG. 7, material is processed according to method 200. As shown in FIG. 7, method 200 includes positioning a transmitter to engage an ore sample with an electromagnetic pulse (210). The ore sample may include a conductive mineral particle and a volume of a gangue. Method 200 also includes specifying a characteristic of the electromagnetic pulse using a processing circuit (220) and selectively depositing energy with the electromagnetic pulse (230), according to the embodiment shown in FIG. 7. The characteristic may be specified based on a desired energy deposition for the conductive mineral particle. In one embodiment, selectively depositing energy with the electromagnetic pulse includes at least one of melting and vaporizing the conductive mineral particle by controlling the transmitter with the processing circuit.

Figure 8:
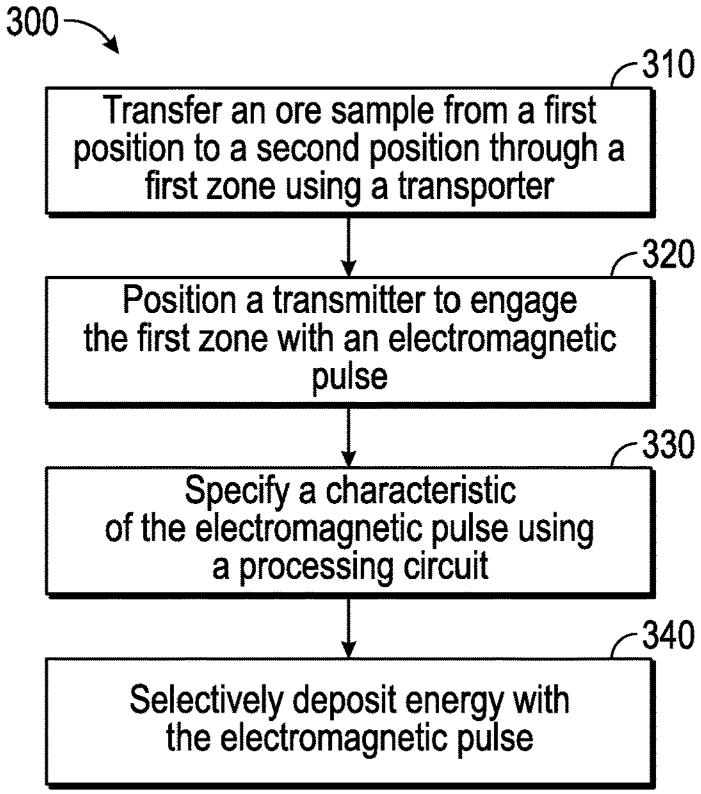

Referring next to the embodiment shown in FIG. 8, material is processed according to method 300. As shown in FIG. 8, method 300 includes transferring an ore sample from a first position to a second position through a first zone using a transporter (310). The ore sample may include a conductive mineral particle and a volume of a gangue. Method 300 also includes positioning a transmitter to engage the first zone with an electromagnetic pulse (320), specifying a characteristic of the electromagnetic pulse using a processing circuit (330), and selectively depositing energy with the electromagnetic pulse (340), according to the embodiment shown in FIG. 8. The characteristic may be specified based on a desired energy deposition for the conductive mineral particle. In one embodiment, selectively depositing energy with the electromagnetic pulse includes at least one of melting and vaporizing the conductive mineral particle by controlling the transmitter with the processing circuit.

While various aspects and embodiments have been disclosed herein, other aspects and embodiments will be apparent to those skilled in the art. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Accordingly, all such modifications are intended to be included within the scope of the present inventions. The order or sequence of any process or method steps may be varied or re-sequenced according to other embodiments. The various aspects and embodiments disclosed herein are for purposes of illustration and are not intended to be limiting, with the true scope and spirit being indicated by the following claims.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data, which cause a general-purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

What is claimed is:

1. A material processing apparatus, comprising:

a transmitter configured to irradiate an ore sample with a sub-millisecond pulse comprising at least one of a sub-millisecond microwave pulse and a sub-millisecond radiofrequency pulse in response to a command signal, the ore sample including a conductive mineral particle and a volume of a gangue; and a processing circuit coupled to the transmitter, wherein the processing circuit is configured to:

specify the command signal for the transmitter, wherein the command signal varies based on a characteristic of the sub-millisecond pulse, wherein the characteristic includes a pulse length of the sub-millisecond pulse, wherein the processing circuit is configured to specify the pulse length based on at least one of (a) a thermal diffusivity of the volume of the gangue and (b) a thermal diffusion rate from the conductive mineral particle into the volume of the gangue; and provide the command signal to the transmitter such that the sub-millisecond pulse selectively deposits energy to at least one of melt and vaporize the conductive mineral particle of the ore sample.

2. The apparatus of claim 1, wherein the characteristic includes a frequency of the sub-millisecond pulse.

3. The apparatus of claim 1, wherein the processing circuit is configured to specify the pulse length based on a particle size of the conductive mineral particle.

4. A material processing apparatus, comprising:

a transmitter configured to irradiate an ore sample with a sub-millisecond pulse comprising at least one of a sub-millisecond microwave pulse and a sub-millisecond radiofrequency pulse in response to a command signal, the ore sample including a conductive mineral particle and a volume of a gangue; and a processing circuit coupled to the transmitter, wherein the processing circuit is configured to:

specify the command signal for the transmitter, wherein the command signal varies based on a characteristic of the sub-millisecond pulse, wherein the characteristic produces an energy deposition from the sub-millisecond pulse into the conductive mineral particle at a rate that is greater than a thermal diffusion rate from the conductive mineral particle into the volume of the gangue; and provide the command signal to the transmitter such that the sub-millisecond pulse selectively deposits energy to at least one of melt and vaporize the conductive mineral particle of the ore sample.

5. A material processing apparatus, comprising:

a transmitter configured to irradiate an ore sample with a sub-millisecond pulse comprising at least one of a sub-millisecond microwave pulse and a sub-millisecond radiofrequency pulse in response to a command signal, the ore sample including a conductive mineral particle and a volume of a gangue;

a processing circuit coupled to the transmitter, wherein the processing circuit is configured to:

specify the command signal for the transmitter, wherein the command signal varies based on a characteristic of the sub-millisecond pulse; and provide the command signal to the transmitter such that the sub-millisecond pulse selectively deposits energy to vaporize the conductive mineral particle of the ore sample to produce a mineral vapor, wherein interaction between the mineral vapor and the ore sample at least partially weakens the volume of the gangue; and at least one of:

a recovery system configured to collect at least a portion of the mineral vapor; and a reducer positioned to decrease the size of the ore sample.

6. The apparatus of claim 5, further comprising the reducer positioned to decrease the size of ore sample.

7. The apparatus of claim 5, wherein the transmitter is configured to selectively melt the conductive mineral particle to produce a mineral liquid and wherein interaction between the mineral liquid and the ore sample at least partially weakens the volume of the gangue.

8. The apparatus of claim 7, further comprising the reducer positioned to decrease the size of the ore sample.

9. A material processing apparatus, comprising:

a transporter configured to transfer an ore sample from a first position to a second position through a first zone, wherein the ore sample includes a conductive mineral particle and a volume of a gangue;

a transmitter positioned to irradiate the first zone with a sub-millisecond electromagnetic pulse in response to a command signal; and a processing circuit coupled to the transmitter, wherein the processing circuit is configured to:

specify the command signal for the transmitter, wherein the command signal varies based on a characteristic of the sub-millisecond electromagnetic pulse; and provide the command signal to the transmitter such that the sub-millisecond electromagnetic pulse selectively deposits energy to at least one of melt and vaporize the conductive mineral particle of the ore sample and produce a treated ore sample;

a reducer positioned to decrease the size of the treated ore sample within a second zone to produce a reduced treated ore sample.

10. The apparatus of claim 9, further comprising a monitor configured to evaluate a size distribution of the reduced treated ore sample and return a portion of the reduced treated ore sample having a size above a threshold value to the first zone.

11. A material processing apparatus, comprising:

a transporter configured to transfer an ore sample from a first position to a second position through a first zone, wherein the ore sample includes a conductive mineral particle and a volume of a gangue;

a transmitter positioned to irradiate the first zone with a sub-millisecond electromagnetic pulse in response to a command signal;

a processing circuit coupled to the transmitter, wherein the processing circuit is configured to:

specify the command signal for the transmitter, wherein the command signal varies based on a characteristic of the sub-millisecond electromagnetic pulse; and provide the command signal to the transmitter such that the sub-millisecond electromagnetic pulse selectively deposits energy to at least one of melt and vaporize the conductive mineral particle of the ore sample; and a recovery system, wherein the sub-millisecond electromagnetic pulse selectively deposits energy to at least partially vaporize the conductive mineral particle of the ore sample and produce a mineral vapor and a treated ore sample and wherein the recovery system is configured to collect at least a portion of the mineral vapor.

12. The apparatus of claim 11, further comprising a reducer positioned to decrease the size of the treated ore sample within a second zone to produce a reduced treated ore sample.

13. The apparatus of claim 12, further comprising a monitor configured to evaluate a size distribution of the reduced treated ore sample and return a portion of the reduced treated ore sample having a size above a threshold value to the first zone.

14. The apparatus of claim 12, further comprising a second transporter configured to transfer the reduced treated ore sample from the reducer through a third zone.

15. The apparatus of claim 14, further comprising a second transmitter and a second recovery system, wherein the second transmitter is positioned to irradiate the third zone with a second sub-millisecond electromagnetic pulse to vaporize a mineral of the reduced treated ore sample to produce a residual mineral vapor and wherein the second recovery system is configured to collect at least a portion of the residual mineral vapor.

* * * * *